(12) United States Patent
Kang et al.

(10) Patent No.: US 8,934,025 B2
(45) Date of Patent: Jan. 13, 2015

(54) METHOD AND APPARATUS FOR PROCESSING IMAGE

(75) Inventors: Man-seok Kang, Suwon-si (KR);
Kwang-min Kim, Seoul (KR);
Seung-soo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 12/775,598

(22) Filed: May 7, 2010

(65) Prior Publication Data

US 2011/0013035 A1 Jan. 20, 2011

(30) Foreign Application Priority Data

Jul. 17, 2009 (KR) ........................ 10-2009-0065478

(51) Int. Cl.
| | | |
|---|---|---|
| *H04N 5/235* | (2006.01) | |
| *H04N 1/393* | (2006.01) | |
| *G06T 3/40* | (2006.01) | |
| *H04N 1/387* | (2006.01) | |
| *G09G 5/391* | (2006.01) | |

(52) U.S. Cl.
CPC *H04N 1/393* (2013.01); *G06T 3/40* (2013.01); *H04N 1/3875* (2013.01); *G09G 5/391* (2013.01); *G09G 2340/0407* (2013.01); *G09G 2340/045* (2013.01)
USPC ...................................... 348/222.1; 348/239

(58) Field of Classification Search
CPC ......... H04N 5/228; H04N 7/18; H04N 5/225; G06K 9/00; G06K 9/32; G06K 9/62; G06T 17/00; G06G 5/00
USPC ................ 348/222.1, 135, 169, 170, 208.14, 348/204.14; 382/298, 209, 103, 118; 345/428, 660
See application file for complete search history.

(56) References Cited

U.S. PATENT DOCUMENTS

| | | |
|---|---|---|
| 7,415,137 B2 | 8/2008 | Chen et al. |
| 7,783,084 B2 | 8/2010 | Imagawa et al. |
| 7,873,221 B2 | 1/2011 | Okada et al. |
| 7,925,118 B2 | 4/2011 | Mori et al. |
| 2001/0030655 A1 | 10/2001 | Anwar |
| 2002/0001411 A1 | 1/2002 | Suzuki et al. |
| 2004/0151376 A1 | 8/2004 | Nomura et al. |
| 2006/0043188 A1 | 3/2006 | Kricorissian |
| 2006/0078055 A1 | 4/2006 | Kanazawa |
| 2006/0177110 A1* | 8/2006 | Imagawa et al. ............... 382/118 |

(Continued)

FOREIGN PATENT DOCUMENTS

| | | |
|---|---|---|
| CN | 1426574 A | 6/2003 |
| CN | 1761309 A | 4/2006 |

(Continued)

OTHER PUBLICATIONS

International Search Report and Written Opinion of the International Searching Authority issued on Dec. 27, 2010, in counterpart International Application No. PCT/KR2010/004203 (9 pages).

(Continued)

*Primary Examiner* — Tuan Ho
(74) *Attorney, Agent, or Firm* — NSIP Law (57) ABSTRACT

A method of processing an image, the method including converting a size of an image generated by photographing an individual subject by using a size of the individual subject in the image, and storing the image having the converted size.

30 Claims, 3 Drawing Sheets

(56) References Cited

U.S. PATENT DOCUMENTS

2007/0053614 A1* 3/2007 Mori et al. .................... 382/299
2007/0110321 A1   5/2007 Okada et al.

FOREIGN PATENT DOCUMENTS

| | | |
|---|---|---|
| JP | 2004-240622 A | 8/2004 |
| JP | 2006-050666 A | 2/2006 |
| JP | 2006-228199 A | 8/2006 |
| JP | 2006-279756 A | 10/2006 |
| JP | 2006-318260 A | 11/2006 |
| JP | 2007-072606 A | 3/2007 |
| JP | 2007-135115 A | 5/2007 |
| JP | 2008-017127   | 1/2008 |
| JP | 2008-199370 A | 8/2008 |
| JP | 2005-341398 A | 12/2008 |
| JP | 2008-310490 A | 12/2008 |
| JP | 2009-130590 A | 6/2009 |
| KR | 10-2006-0055820 A | 5/2006 |
| RU | 2 189 120 C2 | 9/2002 |
| RU | 2242047 C1 | 12/2004 |
| RU | 2 309 450 C1 | 10/2007 |
| WO | WO 2009/038559 A1 | 3/2009 |

OTHER PUBLICATIONS

Russian Decision on Grant mailed Sep. 23, 2013 in counterpart Russian Application No. 2012101457 (19 pages, in Russian, with complete English translation).

Russian Office Action issued Apr. 26, 2013 in counterpart Russian Application No. 2012101457/08 (8 pages, in Russian, with complete English translation).

Chinese Office Action issued Jul. 1, 2013 in counterpart Chinese Application No. 201080032350.6 (19 pages, in Chinese, with complete English translation).

Extended Eurpoean Search Report mailed Dec. 19, 2013 in counterpart European Application No. 10 79 9981.5 (7 pages, in English).

Japanese Office Action mailed Apr. 30, 2014 in counterpart Japanese Application No. 2012-520529 (8 pages, in Japanese with complete English translation).

* cited by examiner

METHOD AND APPARATUS FOR PROCESSING IMAGE

CROSS-REFERENCE TO RELATED PATENT APPLICATION

This application claims the benefit under 35 U.S.C. §119(a) of Korean Patent Application No. 10-2009-0065478 filed on Jul. 17, 2009, in the Korean Intellectual Property Office, the entire disclosure of which is incorporated herein by reference for all purposes.

BACKGROUND

1. Technical Field

The following description relates to an image processing apparatus and a method thereof, and more particularly, to an image processing apparatus and a method thereof, wherein a size of the image is converted by using a size of an individual in the image.

2. Description of the Related Art

Recent developments regarding digital technologies include enhancements in photographic apparatuses (i.e., apparatuses to photograph subjects such as inanimate object, a living being, scenery, etc.) which generate image files. Examples of such photographic apparatuses include cameras, camcorders, personal digital assistants (PDAs), portable multimedia players (PMPs), mobile phones, and navigators having a camera function. The photographic apparatuses may capture an image within a digital photograph, store the photograph within an image file, then output the image file to be displayed on a digital device, such as a digital picture frame.

Also, as functions of the apparatuses become highly efficient, the resolution of an image and a size of an image file increase. Accordingly, a storage space large enough to store a plurality of images is required, but since a size of a storage space in the apparatuses is limited, a method of efficiently storing the images is required.

SUMMARY

In one general aspect, there is provided a method of processing an image within an image processing apparatus, the method including converting a size of an image generated by photographing an individual subject by using a size of the individual subject in the image, and storing the image having the converted size.

The converting of the size of the image may include reducing the size of the image.

The converting of the size of the image may include, determining the size of the image as a first size value in response to the individual subject in the image having a minimum individual subject detecting size.

The minimum individual subject detecting size may be determined according to a type of an individual subject, and where different types of individual subjects are included in the image, the method may include obtaining sizes of the image according to each type of the individual subjects, where each type of the individuals has the minimum individual subject detecting size, and determining the largest size of the image from among the obtained sizes of the image as the first size value.

The converting of the size of the image may include converting the size of the image to the larger value from among the first size value and a second size value, wherein the second size value is the maximum size of the image in response to the image being output according to a reference resolution value.

The method may further include receiving a command to convert the size of the image to a predetermined size, and in response to the predetermined size being smaller than the first size value, outputting information indicating the predetermined size is smaller than the first size value.

The method may further include receiving a command to convert the size of the image to a predetermined size, and in response to the predetermined size being smaller than the larger value from among the first and second size values, outputting information indicating the predetermined size is smaller than the larger value.

The method may further include before the converting of the size of the image, generating additional information about the individual subject in the image, and after the converting of the size of the image, converting the additional information according to the converted size of the image.

The additional information may include at least one of a location and a size of the individual subject in the image, and the converting of the additional information may include converting the additional information to information indicating at least one selected from a location and a size of the individual subject in the image having the converted size.

The apparatus to process an image may be a server that communicates with an apparatus to store an image that is generated with respect to an individual subject, via a communication network, and the method may further include receiving the image that is generated with respect to the individual subject from the apparatus to store an image.

According to another aspect of the present invention, there is provided an apparatus for processing an image, the apparatus including: an image converting unit to convert a size of an image generated by photographing an individual subject, by using a size of the individual subject in the image, and an image storage unit to store the image having the converted size.

The image converting unit may reduce the size of the image.

The apparatus may further include an image analyzing unit to analyze the individual subject in the image, wherein, when the individual subject in the image includes a minimum individual subject detecting size, the image analyzing unit determines the size of the image as a first size value.

The minimum individual subject detecting size may be determined according to a type of an individual, and in response to different types of individual subjects being included in the image, the image analyzing unit obtains sizes of the image according to each type of the individual subjects, when each type of the individual subjects has the minimum individual subject detecting size, and determines the largest size of the image from among the obtained sizes of the image as the first size value.

The apparatus may further include an output unit to output the image, wherein the image converting unit converts the size of the image to the larger value from among the first size value and a second size value, such that the second size value is the maximum size of the image in response to the image being output according to a reference resolution value, and the output unit outputs the image having the converted size.

The apparatus may further include a user interface to receive a command to convert the size of the image to a predetermined size from a user, wherein, in response to the predetermined size being smaller than the first size value, the output unit outputs information indicating the predetermined size is smaller than the first size value.

The apparatus may further include a user interface to receive a command to convert the size of the image to a predetermined size from a user, wherein, in response to the predetermined size being smaller than the larger value from among the first size value and the second size value, the output unit outputs information indicating the predetermined size is smaller than the larger value.

The apparatus may further include an additional information processing unit, wherein the image analyzing unit generates additional information about the individual in the image, and the additional information processing unit may convert the additional information according to the image having the converted size, after the size of the image is converted, and store the converted additional information.

The additional information may include at least one of a location and a size of the individual subject in the image, and the additional information processing unit may covert the additional information to information indicating the at least one of a location and a size of the individual subject in the image having the converted size.

In another general aspect, there is provided a server including a transceiving module to transmit or receive information to or from an apparatus to store an image; an image converting module for converting a size of an image received from the apparatus by using a size of an individual in the image; and an image storing module for storing the image having the converted size.

In another general aspect, there is provided a method of processing an image, performed in a server communicating with an apparatus to generate an image, via a communication network, the method including receiving an image from the apparatus, converting a size of the image by using a size of an individual subject in the image, and storing the image having the converted size.

In another general aspect, there is provided a computer readable storage medium storing a program to execute a method of processing an image, comprising instructions causing a computer to convert a size of an image generated by photographing an individual subject, by using a size of the individual subject in the image, and store the image having the converted size.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and constructions may be omitted for increased clarity and conciseness.

Figure 1:
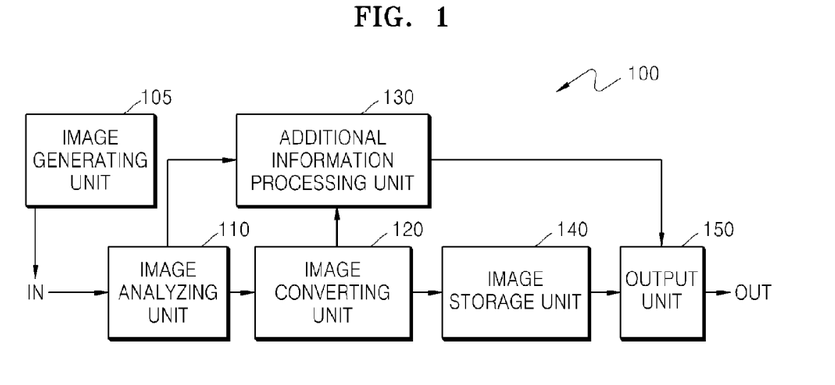
FIG. 1 is a block diagram illustrating an example of an image processing apparatus.

FIG. 1 illustrates an example of an image processing apparatus 100 to process an image. Referring to FIG. 1, the image processing apparatus 100 includes an image analyzing unit 110, an image converting unit 120, an additional information processing unit 130, an image storage unit 140, and an output unit 150.

The image processing apparatus 100 may also include an image generating unit 105 to generate an image or may otherwise receive a generated image from an external image generating apparatus (not illustrated), and output the image on a display screen (not illustrated) such as a cathode-ray-tube (CRT) monitor, LCD screen, plasma screen, etc. Examples of the image processing apparatus 100 include a camcorder, a camera, and a personal digital assistant (PDA), a portable multimedia player (PMP), a mobile phone, a navigator, a laptop, and a digital photo frame having a camera function, but are not limited thereto.

Referring to FIG. 1, the image analyzing unit 110 receives a generated image, and analyzes the received image. The image generating unit 105 may generate an image, for example, where a user photographs a subject. Accordingly, the image analyzing unit 110 may analyze the image generated by the image generating unit 105. Alternatively, the image may be received from the external image generating apparatus, via a wired or wireless communication network.

The image analyzing unit 110 may identify one or a plurality of individual subjects by analyzing the image.

For example, an individual subject may be an inanimate object, a living being, scenery, etc. Where the individual subject is a person, face-recognition functionality within the image analyzing unit 110 may determine that a face of the person represents one individual subject. Accordingly, the generated image may include one or more individual subjects.

A minimum size to detect an individual subject within the generated image may be defined in the image processing apparatus 100. For example, a user may set the image processing apparatus 100 to identify and detect a face when a size of the face is at least 40×50 pixels. That is, the image processing apparatus 100 may be set to not detect a face having a size smaller than 40×50 pixels. Hereinafter, a minimum size of an individual subject that can be recognized and detected by the image analyzing unit 110 will be referred to as a minimum individual subject detecting size, which may differ according to a type of an individual subject. For example, a minimum individual subject detecting size where the individual subject is a face of a person may not be the same as a minimum individual subject detecting size where the individual subject is a car.

Referring to FIG. 1, the image analyzing unit 110 analyzes the received image, and obtains a size of the image where the individual subject in the received image has the minimum individual subject detecting size. The size of the image where the individual subject in the image has the minimum individual subject detecting size will now be referred to as a first size value.

Where a plurality of individual subjects are included in the image, the image analyzing unit 110 obtains a size of the image only where each of the individual subjects has at least a minimum individual subject detecting size, according to each type of the individual subjects. For example, where a face of a person and a car are both included in an image, and the minimum individual subject detecting sizes of the face and the car are not the same, the image analyzing unit 110 may obtain a size of the image where the face has at least a pre-determined minimum individual subject detecting size, and a size of the image when the car has at least a pre-determined minimum individual subject detecting size. Accordingly, the image analyzing unit 110 determines which of the two individual subjects is a bigger size, and denotes the bigger size as the first size value.

The image analyzing unit 110 generates additional information about the individual subject within the image, and transmits the additional information to the additional information processing unit 130. The additional information may include information about a size or a location of the individual subject within the image.

Also, the image analyzing unit 110 transmits the analyzed image and the first size value to the image converting unit 120.

The image converting unit 120 converts the size of the image received from the image analyzing unit 110. The image converting unit 120 reduces the size of the image received from the external image generating apparatus or the image generating unit 105, by using the size of the individual subject.

Where the size of the image is not converted and stored in the image storage unit 140, the image processing apparatus 100 may decode the image, store the decoded image in a memory (not illustrated), and then adjust the image according to a maximum output resolution of the image processing apparatus 100, so as to reproduce the image. However, even where the size of the image required to reproduce the image is within the maximum output resolution of the image processing apparatus 100, storing the image (i.e., a large image) in the image processing apparatus 100 wastes storage space. In effect, a time to decode the image is wasted, and a space of the memory to store the decoded image is wasted. Alternatively, where the size of the image is not converted and stored in the image storage unit 140, the image processing apparatus 100 may crop the image by the maximum output resolution and output a part of the image. In this case, the image is cut, and thus the image may be an inaccurate representation of the original image.

Accordingly, in the image processing apparatus 100, the size of the image is reduced using the size of the individual subject in the image, and the image having the reduced size is stored.

The output unit 150 outputs the image on a display screen (not illustrated) such as a cathode-ray-tube (CRT) monitor, LCD screen, plasma screen, etc. A maximum size value of the image when the output unit 150 outputs the image according to a reference resolution value is set in the image processing apparatus 100. The maximum size value of the image where the output unit 150 outputs the image according to the reference resolution value will now be referred to as a second size value.

The image converting unit 120 compares the first size value received from the image analyzing unit 110 with the second size value, and adjusts the size of the image to the larger value from among the first and second size values. That is, where the image converting unit 120 reduces the size of the image, the image converting unit 120 adjusts the size of the image so that the individual subject is larger than the minimum individual subject detecting size. Otherwise, where the image is smaller than the first size value, the individual is also smaller than the minimum individual subject detecting size, and thus the individual cannot be detected.

The image storage unit 140 stores the image converted by the image converting unit 120.

Where the image converting unit 120 converts the size of the image, the additional information processing unit 130 adjusts the additional information received from the image analyzing unit 110, according to the converted size of the image. In other words, where the size of the image is converted, the additional information processing unit 130 converts the additional information about a size or a location of the individual in the original image to about a size or a location of the individual in the image having the converted size, and then stores the converted additional information in the additional information processing unit 130.

The output unit 150 extracts the image having the converted size from the image storage unit 140, and reproduces the extracted image. The output unit 150 may detect the individual subject from the image having the converted size, like it may from the original image.

Although not illustrated in FIG. 1, the image processing apparatus 100 may further include a user interface (not illustrated) to allow a user to input data. The user may transmit a command for converting the size of the image to a predetermined size to the image processing apparatus 100 by using the user interface.

Where the user transmits the command via the user interface, the image processing apparatus 100 determines whether the predetermined size is smaller than the first size value. In response to the predetermined size being smaller than the first size value, the output unit 150 may output a message indicating that information about the image may be lost while analyzing the image later, since the size of the image is reduced.

Alternatively, the image processing apparatus 100 determines whether the predetermined size is smaller than the larger size from among the first and second size values, and where the predetermined size is smaller than the larger size, the output unit 150 may output a message indicating that a problem may occur while analyzing the image later where the size of the image is reduced.

Referring to FIG. 2, the size of the image is reduced to a minimum size wherein an individual can be detected, by using the size of the individual, thereby obtaining a same result of analyzing the image as the original image, and preventing the waste of space generated by decoding or storing the original image.

Figure 2A:
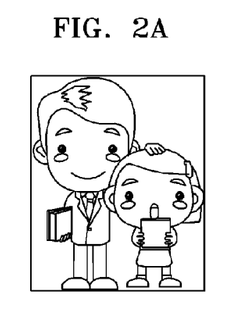
FIGS. 2A through 2F are a series of diagrams illustrating an example conversion of a size of an image.
Figure 2B:
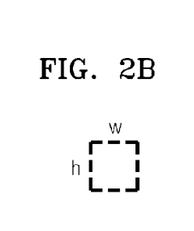

FIGS. 2A through 2F illustrate an example conversion of a size of an image. FIG. 2A illustrates an original image in which two people are illustrated therein. FIG. 2B illustrates a minimum individual subject detecting size of an individual subject in the image, wherein the individual subject is a face of a person.

Figure 2C:
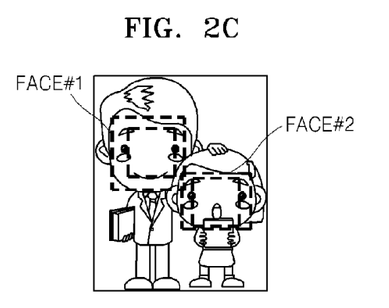

The image analyzing unit 110 of FIG. 1 detects faces of the two people illustrated in the original image of FIG. 2A, and obtains sizes of each of the faces. FIG. 2C illustrates the faces in the original image of FIG. 2A as detected by the image analyzing unit 110. As Illustrated in FIG. 2C, the faces detected by the image analyzing unit 110 are larger than the minimum individual subject detecting size of the faces.

Figure 2D:
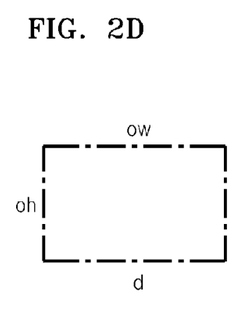
Figure 2E:
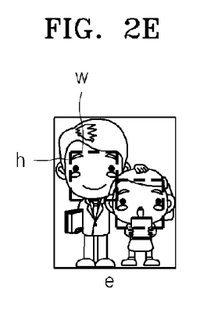

The image analyzing unit 110 determines the size of the image where the face has the minimum individual subject detecting size as a first size value. FIG. 2E illustrates an image where the face has the minimum individual subject detecting size.

Figure 2F:
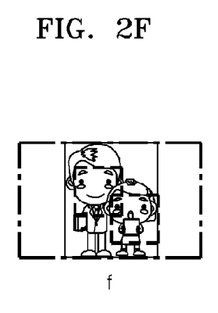

The image converting unit 120 compares the first size value with a second size value, wherein the second size value is the maximum size of the image where the image is output according to a reference resolution value. FIG. 2D illustrates the reference resolution value, and FIG. 2F illustrates an image having the size changed to the second size value according to the reference resolution value. The image converting unit 120 compares the size of the image of FIG. 2E and the size of the image of FIG. 2F, and reduces original image to the size of the image of FIG. 2E, which is the larger size of the two images, i.e., the first size value.

Where the image converting unit 120 converts the size of the image to a value smaller than the first size value, the individual subject cannot be detected since the size of individual subject is smaller than the minimum individual subject detecting size in the image having the converted size.

In other words, where the image converting unit 120 converts the size of the image to the size of FIG. 2F, the size of the individual subject is smaller than the minimum individual subject detecting size in the image having the converted size. Accordingly, three eyes may be detected within the minimum individual subject detecting size, and thus the face may not be detected.

Referring to FIGS. 2A through 2F, a size of an image is converted while considering a minimum individual subject detecting size, and thus information is prevented from being lost while analyzing the image.

Figure 3:
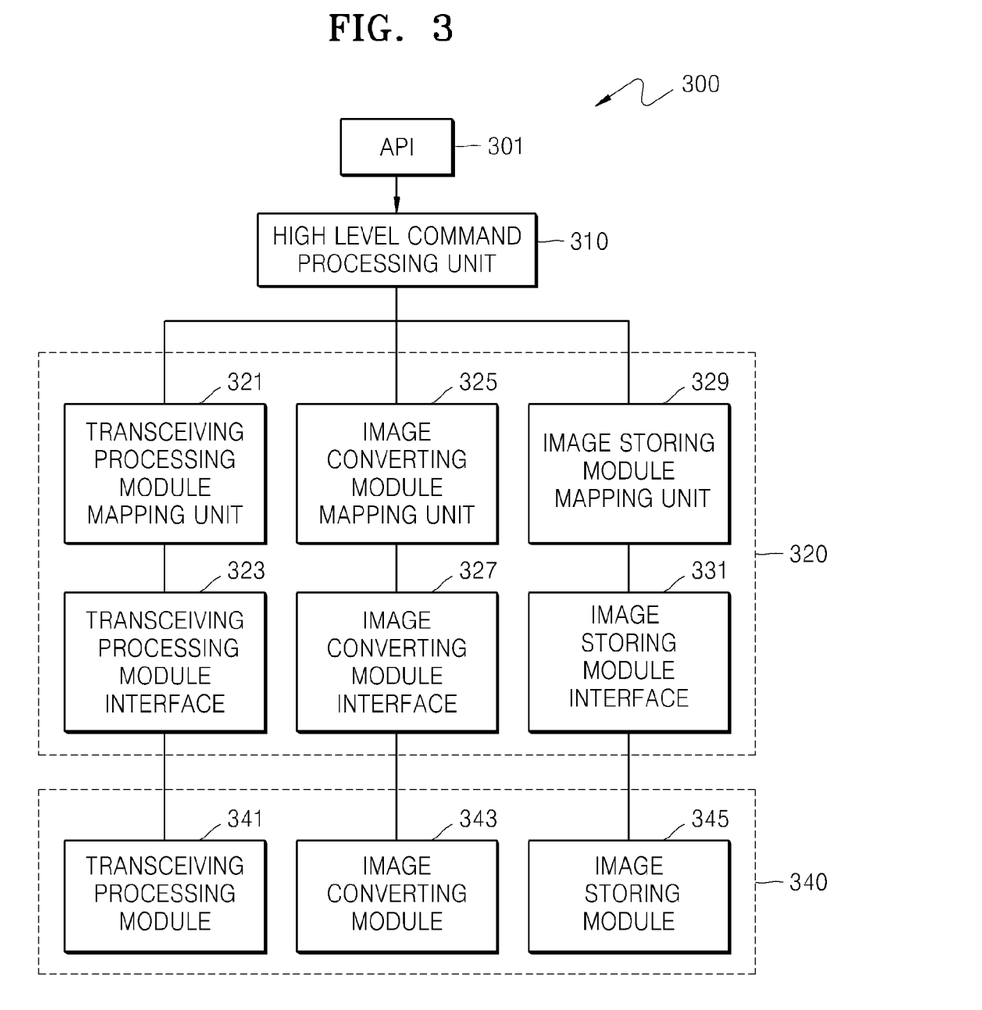
FIG. 3 is a diagram illustrating an example of a server to perform a method of processing an image.

FIG. 3 illustrates an example of a server 300 to perform a method of processing an image. The method may be performed in the server 300 that stores an image and outputs the image, aside from the image processing apparatus 100. A user may upload an image stored in an external image storing apparatus (not illustrated) to a homepage on the internet, by connecting to the server 300 via a communication network. Here, the server 300 may convert the size of the image to be uploaded, and store the image in the server 300.

Referring to FIG. 3, the server 300 includes a transceiving processing module 341, an image converting module 343, and an image storing module 345. More specifically, an application module 340 include the transceiving processing module 341, the image converting module 343, and the image storing module. The transceiving processing module 341 communicates with the external image storing apparatus to store an image, and the image converting module 343 converts a size of the image according to a size of an individual included in the image. The image storing module 345 stores the image having the converted size in the server 300. An overall structure of the server 300 will now be described in detail. The server 300 may use any operating system (OS). The OS controls operations of the application module 340 by providing a high level command to an application program interface (API) 301. The server 300 includes a high level command processing unit 310 that identifies the application module 340 corresponding to the high level command provided by the API 301, and provides the high level command to the corresponding application module 340 by decoding the high level command.

An application module controlling unit 320 controls operations of the application module 340 according to the high level command provided by the high level command processing unit 310. In other words, the high level command processing unit 310 determines whether the application module 340 corresponding to the high level command provided via the API 301 exists. Where the corresponding application module 340 exists, the high level command processing unit 310 decodes the high level command so that the corresponding application module 340 can recognize the high level command, and transmits the decoded high level command to a mapping unit or controls message transmission. Referring to FIG. 3, the application module controlling unit 320 includes a transceiving processing module mapping unit 321, an image converting module mapping unit 325, an image storing module mapping unit 329, a transceiving processing module interface 323, an image converting module interface 327, and an image storing module interface 331.

The transceiving processing module mapping unit 321 receives a high level command to communicate with the external image storing apparatus to store an image from the high level command processing unit 310, maps the high level command to a device level that can be processed by the transceiving processing module 341, and transmits the mapped high level command to the transceiving processing module 341 via the transceiving processing module interface 323.

The image converting module mapping unit 325 and the image converting module interface 327 converts a size of an image by using a minimum individual subject detecting size of an individual included in the image and a reference resolution of the image. The image converting module mapping unit 325 receives a high level command to operate the image converting module 343 from the high level command processing unit 310, maps the high level command to a device level, and provides the mapped high level command to the image converting module 343 via the image converting module interface 327.

The image storing module 345 stores the image having the converted size. The image storing module mapping unit 329 receives a high level command from the high level command processing unit 310, and maps the high level command to a device level that can be recognized by the image storing module 345. The mapped high level command is provided to the image storing module 345 via the image storing module interface 331.

Figure 4:
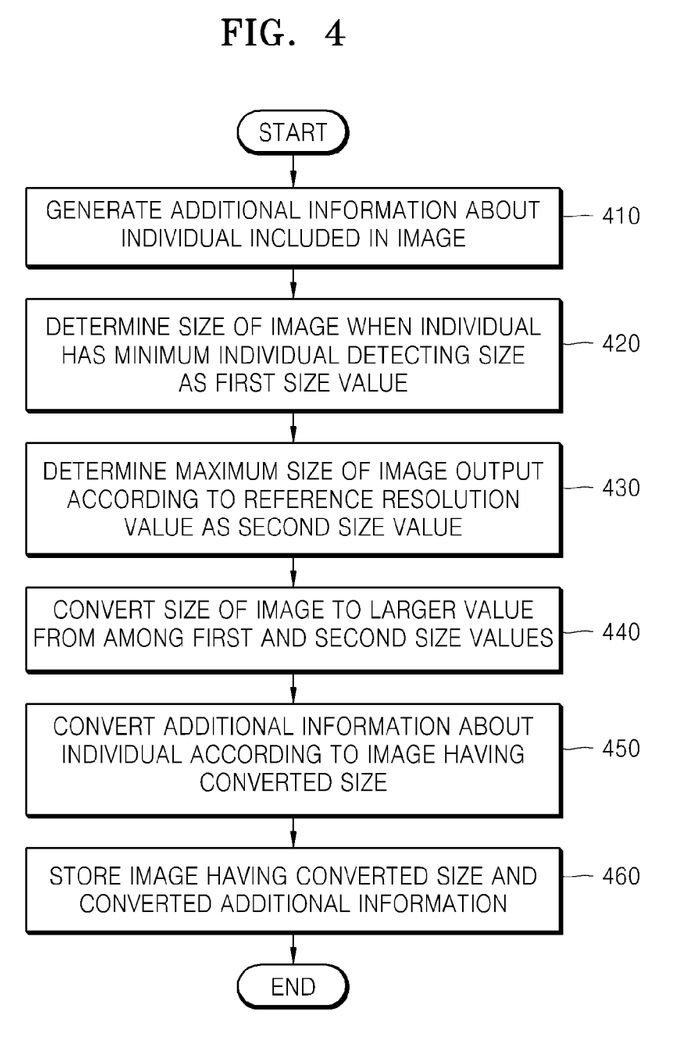
FIG. 4 is a flowchart illustrating an example method of processing an image.

FIG. 4 illustrates an example method of processing an image. The method may be performed by the image processing apparatus 100 of FIG. 1. Referring to FIGS. 1 and 4, the image processing apparatus 100 generates additional information about an individual subject included in an image, by analyzing the image at 410. The additional information about the individual subject indicates a size or a location of the individual subject in the original image. The image processing apparatus 100 determines a size of the image when the individual subject has a minimum individual subject detecting size as a first size value, at 420.

Where different types of individuals are included in the image, the image processing apparatus 100 obtains sizes of the image where each type of the individuals has at least a minimum individual subject detecting size, by using a minimum individual subject detecting size according to each type of the individual subjects, and determines a largest size of the image as the first size value.

The image processing apparatus 100 determines a maximum size of the image output according to a reference resolution value as a second size value, at 430. Then, the image processing apparatus 100 converts the size of the image to the larger value from among the first size value and the second size value at 440.

The image processing apparatus 100 converts the additional information about the individual subject according to the individual subject that is changed according to the image having the converted size, at 450.

At 460, the image processing apparatus 100 stores the image having the converted size, and the converted additional information.

According to certain example(s) described above, an image processing apparatus may be provided to convert a size of an image by using a minimum size of an individual subject to detect the individual subject in the image and then store the image, and a method thereof.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of processing an image within an image processing apparatus, the method comprising:
   receiving a command to convert the size of the image to a predetermined size;
   determining whether a subject in the image having the predetermined size is detectable;
   converting the size of the image according to the command;
   storing the image having the converted size; and
   outputting information indicating that a problem has occurred upon determining that the subject in the image having the converted size is undetectable while analyzing the image having the converted size.

2. The method of claim 1, wherein the converting of the size of the image comprises reducing the size of the image.

3. The method of claim 2, wherein the converting of the size of the image comprises:
   determining the size of the image as a first size value in response to the subject in the image having a minimum subject detecting size.

4. The method of claim 3, wherein the minimum subject detecting size is determined according to a type of subject, and where different types of subjects are included in the image, the method comprises:
   obtaining sizes of the image according to each type of the subjects, when each type of the subjects has the minimum subject detecting size; and
   determining the largest size of the image from among the obtained sizes of the image as the first size value.

5. The method of claim 3, wherein the converting of the size of the image comprises:
   converting the size of the image to the larger value from among the first size value and a second size value, wherein the second size value is the maximum size of the image in response to the image being output according to a reference resolution value.

6. The method of claim 4, further comprising:
   in response to the predetermined size being smaller than the first size value, outputting information indicating the predetermined size is smaller than the first size value.

7. The method of claim 5, further comprising:
   in response to the predetermined size being smaller than the larger value from among the first and second size values, outputting information indicating the predetermined size is smaller than the larger value.

8. The method of claim 1, further comprising:
   before the converting of the size of the image, generating additional information about the individual subject in the image; and
   after the converting of the size of the image, converting the additional information according to the converted size of the image.

9. The method of claim 8, wherein the additional information comprises at least one of a location and a size of the subject in the image, and
   the converting of the additional information comprises converting the additional information to information indicating at least one of a location and a size of the subject in the image having the converted size.

10. The method of claim 1, wherein the apparatus to process an image is a server that communicates with an apparatus to store an image that is generated with respect to a subject, via a communication network, and
    the method further comprises receiving the image that is generated with respect to the subject from the apparatus to store an image.

11. An apparatus to process an image, the apparatus comprising:
    an interface configured to receive a command to convert a size of the image of a subject to a predetermined size;
    an image analyzer configured to receive the image and to analyze the received image and determine a first size of the image;
    an image converter configured to compare the first size of the image from the image analyzer with a second size output from an output unit and to convert the size of the image; and
    an image storer configured to store the image having the converted size from the image converter, wherein the output unit outputs information indicating that a problem has occurred while analyzing the converted size image when it is determined that the subject in the image is undetectable.

12. The apparatus of claim 11, wherein the image converter reduces the size of the image.

13. The apparatus of claim 12, wherein the image analyzer configured to analyze the subject in the image, wherein, when the subject in the image has the minimum subject detecting size, the image analyzer determines the size of the image as a first size value.

14. The apparatus of claim 13, wherein
the minimum subject detecting size is determined according to a type of subject,
in response to different types of subjects being included in the image, the image analyzer obtains sizes of the image according to each type of the subjects, when each type of the subjects has the minimum subject detecting size, and determines the largest size of the image from among the obtained sizes of the image as the first size value.

15. The apparatus of claim 13, wherein
an output unit is configured to output the image,
wherein the image converter converts the size of the image to the larger value from among the first size value and a second size value, such that the second size value is the maximum size of the image in response to the image being output according to a reference resolution value, and
the output unit outputs the image having the converted size.

16. The apparatus of claim 14,
wherein, in response to a predetermined size being smaller than the first size value, the output unit outputs information indicating the predetermined size is smaller than the first size value.

17. The apparatus of claim 15,
wherein, in response to the predetermined size being smaller than the larger value from among the first size value and the second size value, the output unit outputs information indicating the predetermined size is smaller than the larger value.

18. The apparatus of claim 11, further comprising:
an additional information processor,
wherein the image analyzing analyzer generates additional information about the subject in the image, and
the additional information processor converts the additional information according to the image having the converted size, after the size of the image is converted, and stores the converted additional information.

19. The apparatus of claim 18, wherein the additional information comprises at least one of a location and a size of the subject in the image, and
the additional information processor converts the additional information to information indicating the at least one of a location and a size of the subject in the image having the converted size.

20. A server, comprising:
a transceiving module configured to transmit or receive information to or from an apparatus to store an image of a subject;
an image analyzing module configured to determine whether the image of the subject is detectable;
an image converting module configured to convert the size of the image of the subject received from the image analyzing module in response to receiving a command to convert the size of the image of the subject to a predetermined size;
an image storing module configured to store the image having the converted size; and
an output module configured to output information indicating that a problem has occurred while analyzing the converted size image when it is determined that the subject in the image is undetectable.

21. A method of processing an image, performed in a server communicating with an apparatus to generate an image, via a communication network, the method comprising:
receiving an image of a subject from the apparatus;
determining whether the subject of the image is detectable;
converting a size of the image in response to receiving a command to convert the size of the image to a predetermined size;
storing the image having the converted size; and
outputting information indicating that a problem has occurred while analyzing the converted size image when it is determined that the subject in the image is undetectable.

22. A non-transitory computer readable storage medium storing a program to execute a method of processing an image, comprising instructions causing a computer to:
convert a size of an image of a subject in response to receiving a command to convert the size of the image to a predetermined size;
determine whether a subject in the image having the converted size is detectable;
store the image having the converted size; and
output information indicating that a problem has occurred while analyzing the converted size image when it is determined that the subject in the image is undetectable.

23. The apparatus of claim 11, wherein the output unit, when the subject in the image having the converted size is not detectable, to output information indicating that the subject cannot be detected while analyzing the image having the converted size.

24. The apparatus of claim 11, wherein the output unit outputs a message indicating that information has been lost by the conversion.

25. The method of claim 1, wherein the determining further comprises determining whether the subject in the image having the converted size is identifiable.

26. The apparatus of claim 11, wherein the determining further comprises determining whether the subject in the image having the converted size is identifiable.

27. The server of claim 20, wherein the determining further comprises determining whether the subject in the image having the converted size is identifiable.

28. The method of claim 21, wherein the determining further comprises determining whether the subject in the image having the converted size is identifiable.

29. The non-transitory computer readable storage medium storing a program to execute a method of processing an image of claim 22, wherein the determining further comprises determining whether the subject in the image having the converted size is identifiable.

30. An apparatus to process an image, the apparatus comprising:
an image analyzer configured to receive an image and to analyze the received image and determine a first size of the image;
an image converter configured to compare the first size of the image from the image analyzer with a second size output from an output unit and to convert the size of the image; and
an image storer configured to store the image having the converted size from the image converter,
wherein the output unit outputs information indicating that a problem has occurred while analyzing the converted size image when it is determined that a subject in the image is undetectable, and
wherein the image converter converts the size of the image to a larger value from among the first size value and the second size value, such that the second size value is the maximum size of the image in response to the image being output according to a reference resolution value, and the output unit outputs the image having the converted size.

\* \* \* \* \*